(12) United States Patent
Xiao et al.

(10) Patent No.: US 12,474,582 B2
(45) Date of Patent: Nov. 18, 2025

(54) DISPLAY DEVICE

(71) Applicant: BEIJING UNICORN TECHNOLOGY CO., LTD., Beijing (CN)

(72) Inventors: Jiasheng Xiao, Beijing (CN); Bing Xiao, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 532 days.

(21) Appl. No.: 17/907,675

(22) PCT Filed: Mar. 30, 2021

(86) PCT No.: PCT/CN2021/083802
§ 371 (c)(1),
(2) Date: Sep. 29, 2022

(87) PCT Pub. No.: WO2021/197294
PCT Pub. Date: Oct. 7, 2021

(65) Prior Publication Data
US 2023/0228997 A1 Jul. 20, 2023

(30) Foreign Application Priority Data

Mar. 31, 2020 (CN) .......................... 202010242055.9

(51) Int. Cl.
*G02B 27/01* (2006.01)
(52) U.S. Cl.
CPC ................................ *G02B 27/0172* (2013.01)
(58) Field of Classification Search
CPC ............... G02B 27/0172; G02B 5/003; G02B 2027/012; G02B 27/283; G02B 27/0101; G02B 27/286
See application file for complete search history.

(56) References Cited

U.S. PATENT DOCUMENTS 3,666,346 A * 5/1972 Lucas ................ G02B 27/0101
385/116
6,124,977 A 9/2000 Takahashi
(Continued)

FOREIGN PATENT DOCUMENTS

CN 1751268 A 3/2006
CN 105659148 A 6/2016
(Continued)

OTHER PUBLICATIONS

English translation of JP-2010185947-A (Year: 2010).*
(Continued)

*Primary Examiner* — Collin X Beatty
(74) *Attorney, Agent, or Firm* — K&L Gates LLP

(57) ABSTRACT

The present disclosure provides a display device, the display device includes an optical imaging apparatus including an image source element, a beam splitting element, and a reflective element configured to be aligned on light path; and an absorbing element, a shape of the absorbing element and an arrangement position of the absorbing element in the display device cause the absorbing element to absorb non-imaging light in a scene to be displayed, and not block imaging light for generating a display image of the scene to be displayed. In the display device, the absorbing element absorbs the non-imaging light in the scene to be displayed and reduces the non-imaging light in the display device, in turn reduces influence of the non-imaging light on the scene to be displayed and improves display quality of the display image of the scene to be displayed.

20 Claims, 12 Drawing Sheets

(56) References Cited

U.S. PATENT DOCUMENTS

| | | | |
|---|---|---|---|
| 6,646,809 | B1 | 11/2003 | Ishino et al. |
| 9,594,261 | B2 | 3/2017 | Woodgate et al. |
| 2003/0129567 | A1 | 7/2003 | Cabato et al. |
| 2012/0133851 | A1* | 5/2012 | Suga .................. H04N 9/3176 349/9 |
| 2017/0115486 | A1 | 4/2017 | Border et al. |
| 2018/0348520 | A1 | 12/2018 | Chiu et al. |
| 2019/0025589 | A1 | 1/2019 | Haddick |
| 2019/0250400 | A1 | 8/2019 | Ricks et al. |

FOREIGN PATENT DOCUMENTS

| | | |
|---|---|---|
| CN | 108227205 A | 6/2018 |
| CN | 111308715 A | 6/2020 |
| CN | 211426944 U | 9/2020 |
| JP | 2010185947 A | 8/2010 |
| JP | 2012058690 A | 3/2012 |
| KR | 1020050005867 A | 1/2005 |
| WO | 2013049248 A2 | 4/2013 |
| WO | 2013049248 A3 | 4/2013 |

OTHER PUBLICATIONS

The Extended European Search Report received in the corresponding European Application 21781674.3, mailed on Aug. 22, 2023.
International Search Report mailed in International Application PCT/CN2021/083802 on Jun. 22, 2021.
First OA received in CN Application No. 202210396119.X; mailed Jul. 2, 2024.

* cited by examiner

DISPLAY DEVICE

CROSS REFERENCES TO RELATED APPLICATIONS

This application is a National Stage of International Application No. PCT/CN2021/083802, filed Mar. 30, 2021, entitled "DISPLAY DEVICE," which claims priority to Chinese Patent Application No. 202010242055.9, filed Mar. 31, 2020, entitled "DISPLAY DEVICE," both of which are hereby incorporated by reference in their entireties for all purposes.

FIELD

The present disclosure relates generally to the technical field of optical engineering, and more particularly, to a display device.

BACKGROUND

VR (Virtual Reality) and AR (Augmented Reality) are widely used technologies, which have been applied in education, medical care, design, and many other fields. VR is an integration of computer, electronic information, and simulation technology, and implemented in a way that a computer simulates a virtual environment to give people a sense of environmental immersion. As for AR, computer-generated text, images, 3D models, music, videos, and other virtual information are applied to the real world after being simulated, and the two kinds of information complement each other, thereby enhancing the real world.

Both VR device and AR device are composed of several optical elements, and these optical elements are assembled in a certain combination to implement optical imaging.

SUMMARY

In view of the above, the present disclosure provides a display device. The display device includes an optical imaging apparatus, the optical imaging apparatus includes an image source element, a beam splitting element, and a reflective element configured to be aligned on a light path; light emitted by the image source element is reflected to the reflective element through the beam splitting element, the reflective element reflects light to the beam splitting element, and the beam splitting element transmits light; and an absorbing element, a shape of the absorbing element and an arrangement position of the absorbing element in the display device cause the absorbing element to absorb non-imaging light in a scene to be displayed, and not block imaging light for generating a display image of the scene to be displayed. In the display device, the absorbing element absorbs the non-imaging light in the scene to be displayed and reduces the non-imaging light in the display device, in turn reduces influence of the non-imaging light on the scene to be displayed and improves display quality of the display image of the scene to be displayed.

According to an aspect of the present disclosure, a display device is provided, including an optical imaging apparatus, including an image source element, a beam splitting element, and a reflective element configured to be aligned on a light path; light is emitted by the image source element and reflected to the reflective element through the beam splitting element, reflected to the beam splitting element by the reflective element, and transmitted by the beam splitting element; and an absorbing element, a shape of the absorbing element and an arrangement position of the absorbing element in the display device causing the absorbing element to absorb non-imaging light in a scene to be displayed, and not blocking imaging light for generating a display image of the scene to be displayed.

BRIEF DESCRIPTION OF THE DRAWINGS

By referring to the following appended drawings, a further understanding of the nature and advantages of the embodiments of the present application may be achieved. In the appended drawings, similar components or features may have the same reference label. The appended drawings are used to provide a further understanding of the embodiments of the present invention and constitute a part of the present application, and used to, together with the following detailed description, explain the embodiments of the present application, but do not constitute a limitation to the embodiments of the present application. In the appended drawings.

DETAILED DESCRIPTION

The subject described herein will be discussed below with reference to example embodiments. It should be understood that discussion of these embodiments is only to enable those skilled in the art to better understand and implement the subject described herein, and is not to limit the application. Functions and arrangements of the discussed elements may be changed without departing from the protection scope of the content of embodiments of the present application. Various examples may omit, replace or add various processes or components as needed. In addition, features described with respect to some examples may also be combined in other examples.

As used herein, the term "including" and its variants represents open terms, meaning "including but not limited to." The term "based on" represents "based at least in part on." The terms "one embodiment" and "an embodiment" represent "at least one embodiment." The term "another embodiment" represents "at least one other embodiment." The terms "first", "second", etc. may refer to different or the same objects. Other definitions may be included below, either explicit or implicit. The definition of a term is consistent throughout the application, unless clearly indicated otherwise in the context.

VR and AR are widely used technologies, which have been applied in education, medical care, design and many other fields. VR is an integration of computer, electronic information and simulation technology, and implemented in a way that a computer simulates a virtual environment to give people a sense of environmental immersion. As for AR, computer-generated text, images, 3D models, music, videos and other virtual information are applied to the real world after being simulated, and the two kinds of information complement each other, thereby enhancing the real world.

Figure 1:
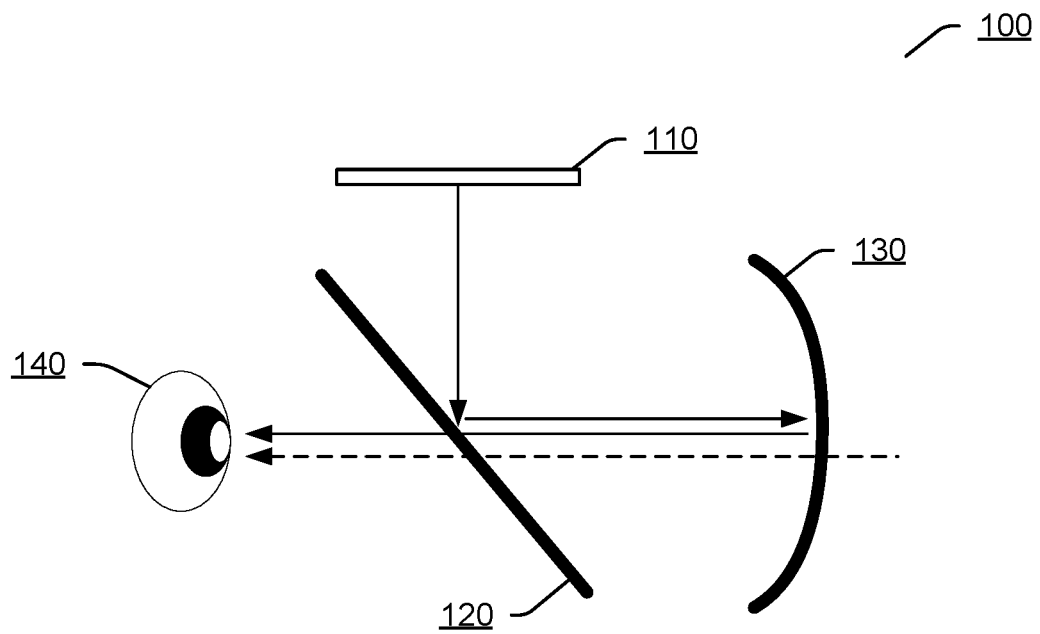
FIG. 1 illustrates a schematic diagram of an AR device assembled from a plurality of optical elements of an example.

Both VR device and AR device are composed of several optical elements, and these optical elements are assembled in a certain combination to implement optical imaging. FIG. 1 illustrates a schematic diagram of an AR device assembled from a plurality of optical elements of an example. As shown in FIG. 1, an AR device 100 includes an image source element 110, a beam splitting element 120, and a reflective element 130. Imaging light processed by the AR device 100 includes imaging light emitted by the image source element 110 and imaging light in a real scene.

For imaging light emitted by the image source element 110 (e.g., the light indicated by solid line in FIG. 1), the imaging light emitted by the image source element 110 is reflected by the beam splitting element 120 to the reflective element 130, then the imaging light is reflected by the reflective element 130 to the beam splitting element 120, and further transmitted by the beam splitting element 120 to a human eye 140, so that the human eye 140 is able to see the image projected by the image source element 110.

For imaging light in a real scene (e.g., the light indicated by dashed line in FIG. 1), the imaging light is transmitted through the reflective element 130 to the beam splitting element 120, and then transmitted by the beam splitting element 120 to the human eye 140, so that the human eye 140 is able to see corresponding real scene.

However, in addition to the imaging light, light emitted by the image source element 110 also includes non-imaging light (also referred to as stray light), and the non-imaging light is undesired light that deviates from the imaging light path. The non-imaging light affects display quality of an imaged image, and the more non-imaging light, the worse the display quality of the imaged image. Therefore, how to eliminate non-imaging light is an urgent problem to be solved for an optical device assembled from optical elements.

In order to solve the problem described above, the present disclosure provides a display device. The display device includes an optical imaging apparatus, the optical imaging apparatus includes an image source element, a beam splitting element, and a reflective element configured to be aligned on a light path; and an absorbing element having a shape and an arrangement position in the display device to cause the absorbing element to absorb non-imaging light in a scene to be displayed, and not block imaging light for generating a display image of the scene to be displayed. In the display device, the absorbing element absorbs the non-imaging light in the scene to be displayed and reduces the non-imaging light in the display device, in turn reduces influence of the non-imaging light on the scene to be displayed and improves display quality of the display image of the scene to be displayed.

A display device according to the present disclosure is described in detail below in conjunction with the appended drawings.

Figure 2:
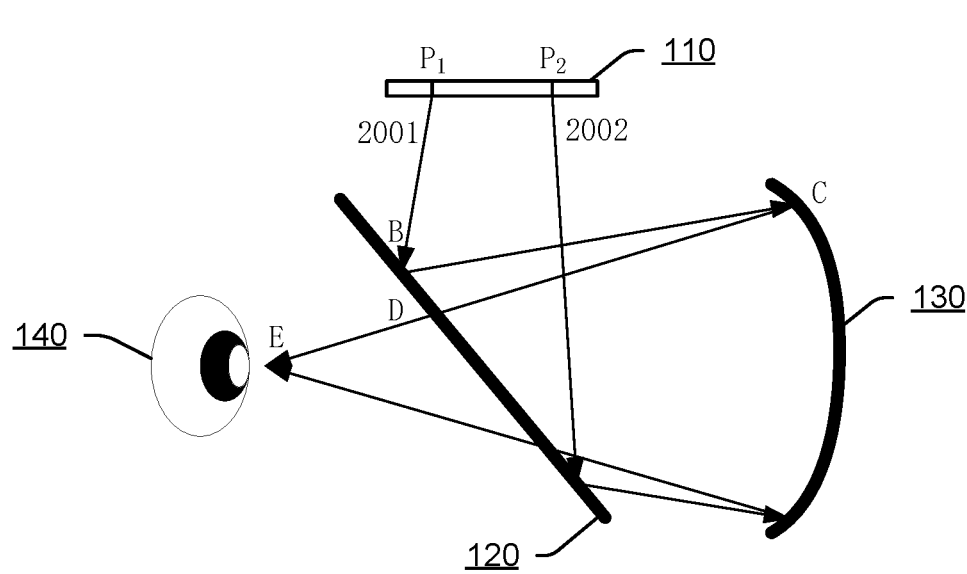
FIG. 2 illustrates a schematic diagram of a display device of an example of an embodiment of the present disclosure.

FIG. 2 illustrates a schematic diagram of a display device of an example of an embodiment of the present disclosure. It should be noted that the display device has a stereoscopic structure, and the schematic diagram shown in FIG. 2 is a schematic plan view from a viewing angle. For example, if the display device uses a three-dimensional coordinate system (such as the xyz coordinate system) as the reference system, the schematic diagram shown in FIG. 2 uses the yz coordinate system as the reference system. In an embodiment of the present description, a display device can be head-mounted, or can be other forms such as non-head-mounted.

As shown in FIG. 2, a display device can include an optical imaging apparatus, the optical imaging apparatus 200 includes an image source element 110, a beam splitting element 120, and a reflective element 130 configured to be aligned on a light path. Light path alignment means that a plurality of optical elements are combined into a system so that light travels along a set path to implement a given function. In an embodiment of the present description, an image source element 110, a beam splitting element 120, and a reflective element 130 aligned on a light path can cooperate with each other to project imaging light of a display image of a scene to reach to a human eye 140, thereby enabling the human eye 140 to see a projected display image.

Taking FIG. 2 as an example, the solid lines shown in FIG. 2 represent imaging light emitted by an image source element 110, i.e. imaging light 2001 and imaging light 2002. The imaging light 2001 and the imaging light 2002 emitted by the image source element 110 are reflected to a reflective element 130 by a beam splitting element 120, then the imaging light 2001 and the imaging light 2002 are reflected to the beam splitting element 120 via the reflective element 130, and further transmitted to a human eye 140 by the beam splitting element 120.

In an example, an image source element 110, a beam splitting element 120, and a reflective element 130 form a composite air-conducting structure, the space between respective optical elements forming the composite air-conducting structure is empty, and the medium for propagating light among the respective optical elements is air. The composite air-conducting structure includes a birdbath structure. In the composite air-conducting structure, the image source element 110 emits light and projects it to the beam splitting element 120, a portion of the light is reflected by the beam splitting element 120 to the reflective element 130, and the light is reflected by the reflective element 130, then the light is transmitted through the beam splitting element 120 to a human eye position. Ambient light is sequentially transmitted through the reflective element 130 and the beam splitting element 120 to the human eye position. In another example, an image source element 110, a beam splitting element 120, and a reflective element 130 constitute a free-form curved prism system. The medium for propagating light among respective optical elements of the free-form curved prism system is the material of the optical element itself, and its light path is similar to that of the composite air-conducting structure.

An image source element 110 can be configured to generate a display image, an optical imaging apparatus is configured to project the display image to a human eye 140, so that a user wearing a display device is able to see the display image. Light from an edge of the display image can also be projected to the human eye 140, so that the display image can be completely presented to the human eye 140.

As shown in FIGS. 2, P1 and P2 in an image source element 110 represent edges of an image projection area, the image projection area is configured to generate and project a display image, and edges of the image projection area are a part of the display image. Therefore, imaging light emitted from these edges is also projected to a human eye 104. The position P1 is the most peripheral position, imaging light emitted by the position P1 is imaging light 2001, P2 is also the most peripheral position, imaging light emitted by the P2 position is imaging light 2002, and light between the imaging light 2001 and the imaging light 2002 is imaging light.

Figure 3:
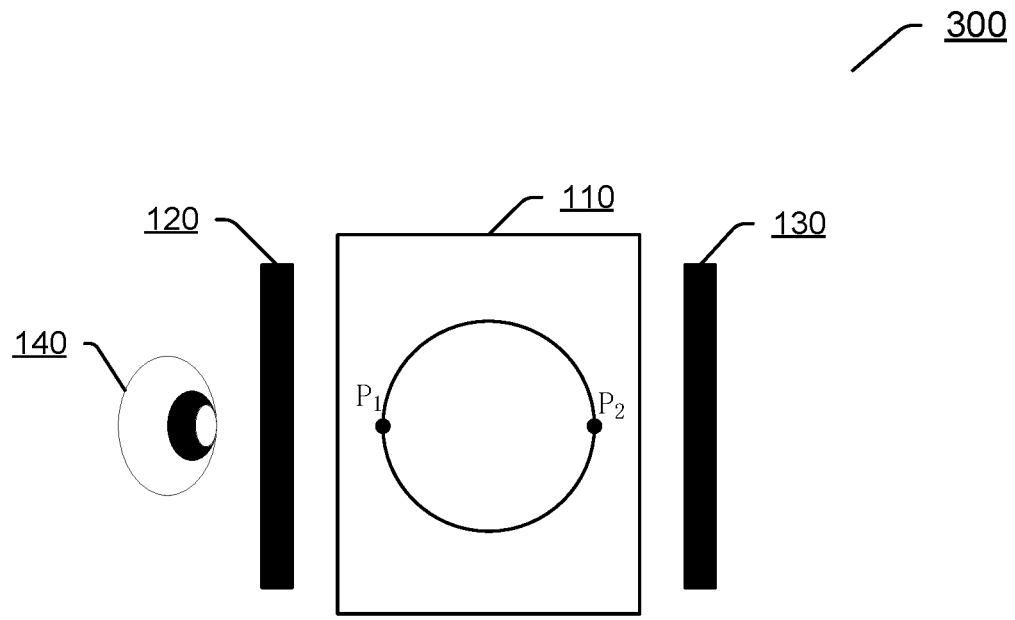
FIG. 3 illustrates a schematic diagram that an image projection area of an image source element is circular of an example of an embodiment of the present disclosure.

An image projection area of an image source element 110 can be of a designated shape, e.g., the image projection area can have one of rectangular, square, and circular shape. Taking FIG. 3 as an example, FIG. 3 illustrates a schematic diagram that an image projection area of an image source element 110 is circular of an example of an embodiment of the present disclosure. As shown in FIG. 3, the image projection area of the image source element 110 is circular, and a circular display image can be generated in the circular area. In this case, the position P1 is the edge point closest (most adjacent) to a human eye 140 in the circular area, and the position P2 is the edge point farthest (most away) from the human eye 140 in the circular area.

Figure 4:
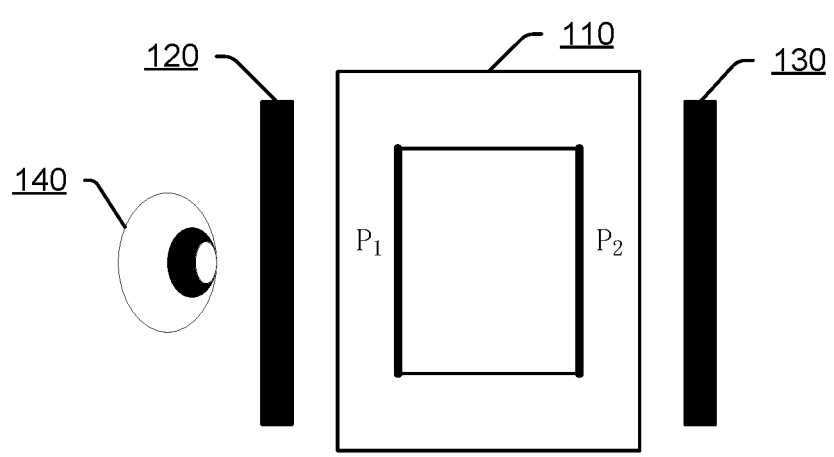
FIG. 4 illustrates a schematic diagram that an image projection area of an image source element is rectangular of an example of an embodiment of the present disclosure.

Taking FIG. 4 as an example, FIG. 4 illustrates a schematic diagram that an image projection area of an image source element 110 is rectangular of an example of an embodiment of the present disclosure. As shown in FIG. 4, the image projection area of the image source element 110 is rectangular, and a rectangular display image can be generated in the rectangular area, at this point. The position P1 is an edge position on the side closest (most adjacent) to a human eye 140 (shown by the thick solid line in the figure), and the position P2 is an edge position on the side farthest (most away) from a human eye 140 (shown by the thick solid line in the figure). The following description is given by taking an example that an image projection area of an image source element 110 is rectangular.

In an example, imaging light emitted from an edge of an image projection area is edge imaging light, and edge imaging light in the imaging light emitted by an image source element 110 can be configured. For example, imaging light 2001 and imaging light 2002 can be configured. For example, a hole with a specified length is set at the position of a human eye 140, light passing through the hole and projected to the human eye 140 is imaging light, and the specified length is properly set so that the imaging light 2001 and the imaging light 2002 are projected through the edge defining the hole to the human eye 140, in this way, the imaging light 2001 and the imaging light 2002 become edge imaging light.

In another example, for imaging light emitted by an image source element 110, at least one of a reflection point on a beam splitting element 120, a reflection point on a reflective element 130, a transmission point on the beam splitting element 120, and an incident point reaching a human eye 140 belongs to an edge position of an element or field of view of a human eye, thus it can be determined that the imaging light is edge imaging light. Taking FIG. 2 as an example, for the imaging light 2001, a reflection point on the beam splitting element 120 is point B, a reflection point on the reflective element 130 is point C, a transmission point on the beam splitting element 120 is point D, and an incident point reaching the human eye 140 is point E, when at least one of the point B and/or point D are at an edge of the beam splitting element 120, the point C is at an edge of the reflective element 130, and the point E is at an edge of the field of view of the human eye 140, it can be determined that the imaging light 2001 is edge imaging light.

Figure 5:
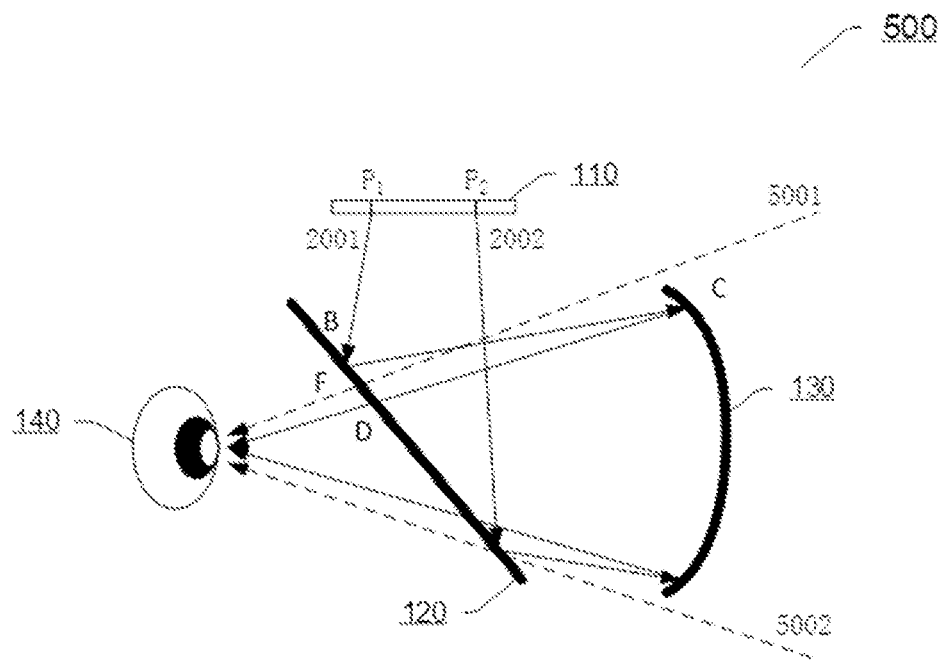
FIG. 5 illustrates a schematic diagram of a display device of another example of an embodiment of the present disclosure.

In an embodiment of the present disclosure, a display device can be one of a virtual reality device, an augmented reality device, etc. The above description corresponding to FIG. 2 can be referred to a virtual reality device, and FIG. 5 can be taken as an example for an augmented reality device. FIG. 5 illustrates a schematic diagram of a display device of another example of an embodiment of the present disclosure. As shown in FIG. 5, in addition to receiving display image projected by an image source element 110, a human eye 140 can also receive imaging light of a real scene, and imaging light of the real scene can present the real scene to the human eye 140. In this way, the human eye 140 can simultaneously see virtual scene formed by the display image and the real scene, thus achieving the effect of augmented reality.

Imaging light of the real scene include edge imaging light, and the edge imaging light is used to define a range of the real scene presented to a human eye 140. As shown in FIG. 5, edge imaging light of the real scene includes the imaging light 5001 and the imaging light 5002, and the portion between the imaging light 5001 and the imaging light 5002 is the real scene presented to the human eye 140. In an example, edge imaging light of a real scene can be configured, e.g., a visible range of the real scene can be limited by using the housing of a display device, and the imaging light 5001 and imaging light 5002 are the uppermost edge imaging light and the lowermost edge imaging light of the visible range respectively.

In addition to imaging light, light emitted by an image source element 110 also includes non-imaging light, and the non-imaging light is undesired light that deviates from the imaging light path. In an example, imaging light emitted by an image source element 110 is projected to a human eye 140 in the sequence of a beam splitting element 120, a reflective element 130, and the beam splitting element 120. In the present disclosure, light emitted by an image source element 110 that is not projected to a human eye 140 in this order can be regarded as non-imaging light.

Figure 6:
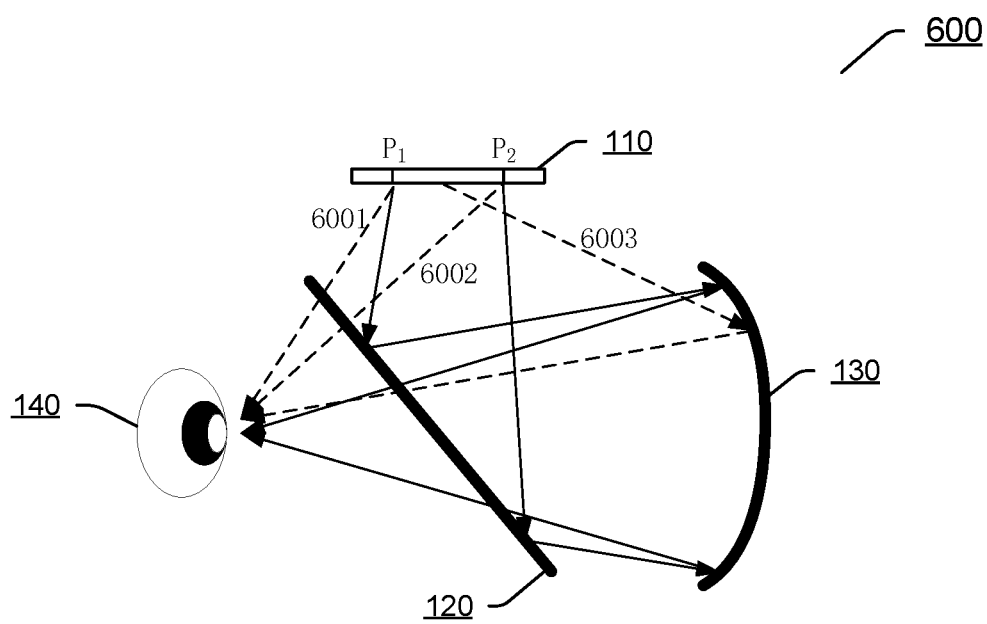
FIG. 6 illustrates a schematic diagram of non-imaging light in a display device of an example of an embodiment of the present disclosure.

FIG. 6 illustrates a schematic diagram of non-imaging light in a display device of an example of an embodiment of the present disclosure. As shown in FIG. 6, the light indicated by the dashed line is non-imaging light, the non-imaging light 6001 is emitted from a position P1 and directly transmitted to a human eye 140 through a beam splitting element 120, and the non-imaging light 6002 is emitted from a position P2 and directly transmitted to the human eye 140 through the beam splitting element 120. The non-imaging light 6003 is emitted from a position in an image projection area and reflected to the beam splitting element 120 via a reflective element 130, and then transmitted to the human eye 140 by the beam splitting element 120.

In an example of the present description, an optical imaging apparatus can further include a circular polarizer attached to or adjacent to the side of an image source element 110 facing towards a beam splitting element 120, and the beam splitting element 120 includes a polarizer and a wave plate attached to the side of the polarizer facing towards a reflective element 130, and the wave plate may be a quarter wave plate. The reflective element 130 can include a transflective element.

Imaging light of a virtual scene image emitted by an image source element 110 is transmitted through a circular polarizer to a beam splitting element 120, and reflected by the beam splitting element 120 to a transflective element, the transflective element reflects the imaging light of the virtual scene image, and the imaging light is transmitted through a beam splitting element to a position of a human eye, and the imaging light of a real scene image is sequentially transmitted through the transflective element and the beam splitting element 120 to the position of the human eye.

In an example of the present description, an optical imaging apparatus further includes a first polarizer attached to or adjacent to the side of an image source element 110 facing towards a beam splitting element, a beam splitting element 120 includes a transflective element, and a reflective element 130 includes a second polarizer.

Imaging light of a virtual scene image emitted by an image source element 110 is transmitted through a first polarizer to a transflective element, and reflected by the transflective element to a second polarizer, and the second polarizer reflects the imaging light of the virtual scene image, and the imaging light is transmitted through the transflective element to a human eye position, and imaging light of a real scene image is sequentially transmitted through the second polarizer and the transflective element to the human eye position.

A display device further includes an absorbing element, a shape of the absorbing element and an arrangement position of the absorbing element in the display device cause the absorbing element to absorb non-imaging light in a scene to be displayed, and not block imaging light for generating a display image of the scene to be displayed.

In an embodiment of the present disclosure, when a display device is a virtual reality device, a scene to be displayed is a virtual scene for a display image generated by an image source element 110. At this point, an absorbing element does not block imaging light (e.g., imaging light 2001 and 2002) generated by the image source element 110.

When a display device is an augmented reality device, a scene to be displayed includes a real scene and a virtual scene. At this point, an absorbing element does not block imaging light generated by the image source element 110 (e.g., imaging light 2001 and 2002) and imaging light of the real scene (e.g., imaging light 5001 and 5002).

In an example, an absorbing element can include a substrate and an absorbing layer. The absorbing layer can be located on a surface of the substrate to form an absorbing element, and the absorbing layer can be configured to absorb light projected on the absorbing layer. Neither the substrate nor the absorbing layer of the absorbing element blocks imaging light for generating a display image of a scene to be displayed.

Figure 7:
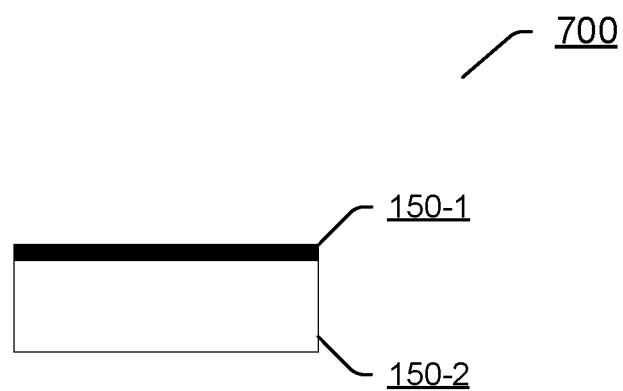
FIG. 7 illustrates a schematic diagram that an absorbing layer of an absorbing element has a planar structure of an example of an embodiment of the present disclosure.

In an example, an absorbing layer can be formed as a planar structure or a concave structure. FIG. 7 illustrates a schematic diagram that an absorbing layer of an absorbing element has a planar structure of an example of an embodiment of the present disclosure. As shown in FIG. 7, an absorbing element 700 includes an absorbing layer 150-1 and a substrate 150-2, the absorbing layer 150-1 has a planar structure, and the absorbing layer 150-1 and the substrate 150-2 are combined together to form the absorbing element 700. The absorbing layer 150-1 can be attached to a side surface of the substrate 150-2. An area of the absorbing layer 150-1 can be the same as that of the side surface of the substrate 150-2, and the absorbing layer 150-1 completely shields this side surface of the substrate 150-2.

Figure 8:
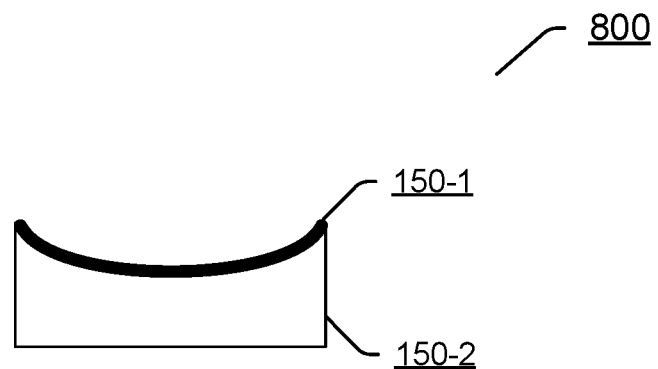
FIG. 8 illustrates a schematic diagram that an absorbing layer of an absorbing element has a concave structure of an example of an embodiment of the present disclosure.

FIG. 8 illustrates a schematic diagram that an absorbing layer of an absorbing element has a concave structure of an example of an embodiment of the present disclosure. As shown in FIG. 8, an absorbing layer 150-1 included in the absorbing element 800 has a concave structure, and the absorbing layer 150-1 is concave toward the side of a substrate 150-2.

The following description is given by taking an absorbing layer as an example of a planar structure.

In an example, an absorbing layer has a microstructure array distribution, and recesses are formed between two adjacent microstructures in the microstructure array. The microstructure in the absorbing layer can be specified. In an example, the microstructures in the microstructure array can include at least one of a triangular structure, parallelogram structure, trapezoidal structure, and rectangular structure, etc.

Figure 9:
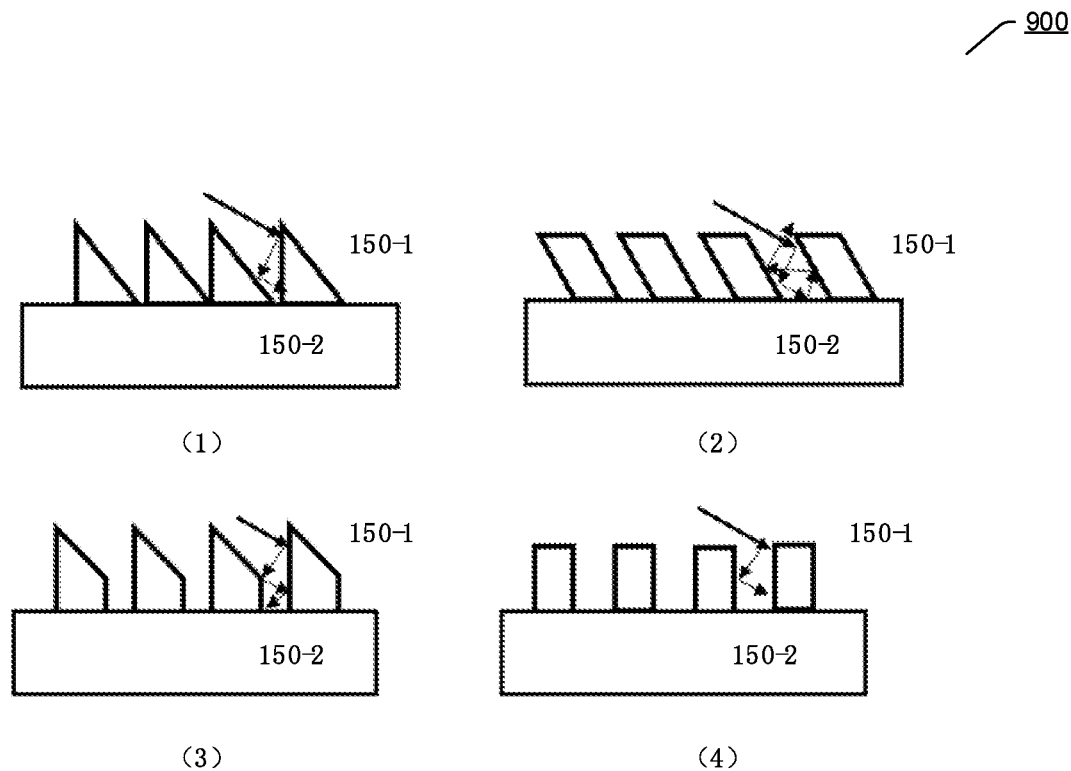
FIG. 9 illustrates a schematic diagram of microstructures of an absorbing layer having a microstructure array distribution of an example of an embodiment of the present disclosure.

FIG. 9 illustrates a schematic diagram of microstructures of an absorbing layer has a microstructure array distribution of an example of an embodiment of the present disclosure. As shown in FIG. 9, the shape of the microstructure shown in FIG. 1) is a triangle, the shape of the microstructure shown in FIG. 2) is a parallelogram, the shape of the microstructure shown in FIG. 3) is a trapezoid, and the shape of the microstructure shown in FIG. 4) is rectangle.

In an example, an array distribution of microstructures can also be specified. Array distributions of different microstructures can be different. For example, the array distribution having triangular structures is arranged with intervals of 10 micrometers, namely, two adjacent triangular structures are arranged at an interval of 10 micrometers. The array distribution of parallelograms is arranged with intervals of 20 micrometers, namely, two adjacent parallelogram structures are arranged at an interval of 20 micrometers. Microstructure array is uniformly distributed on a substrate 150-2.

In this example, absorbing layer having the microstructure array distribution can reflect light multiple times, and can absorb once during each reflection process, and can substantially eliminate or even completely eliminate the light after multiple reflections.

In an example, a surface of planar structure or recess structure of an absorbing layer has an absorbing coating. In this example, a surface of the concave structure of the absorbing layer includes a surface of a microstructure. When light is projected on the absorbing layer, the light is reflected multiple times on the surface of the microstructure, and the surface of the microstructure (namely, the inner surface of the absorbing layer) has an absorbing coating, and in the process of multiple reflections, the absorbing coating absorbs the light multiple times to achieve the purpose of absorbing the light.

In an example, a microstructure array has a distribution on a substrate 150-2 at intervals, a surface of the microstructure array has an absorbing coating, and positions corresponding intervals of the microstructure array of the substrate 150-2 also have absorbing coatings.

Taking FIG. 9 (1) as an example, when a microstructure is a triangular structure, a surface of the triangular structure has an absorbing coating, light is reflected multiple times on the surfaces of two adjacent triangular structures, and absorbing coating on the surfaces of the two triangular structures absorbs the light multiple times until the light is completely absorbed.

In an example, an absorbing wavelength band of an absorbing coating includes at least one of an emission wavelength band of an image source element 110 and the entire visible light wavelength band.

In an example of the present disclosure, an absorbing element can include a first absorbing element that is attached to an edge portion of an image source element 110 adjacent to a position of a human eye 140 and extends toward a beam splitting element 120. The position of the human eye 140 and the reflective element 130 are respectively located on both sides of the beam splitting element 120, and the reflective element 130 can reflect imaging light to the position of the human eye 140.

In this example, the attachment can be that the first absorbing element is in contact with the image source element 110, and it can also be that the first absorbing element is connected to the image source element 110. The edge portion is an area around the edge, and the edge portion adjacent to the position of the human eye 140 includes a portion of the area around the edge adjacent to the position of the human eye 140 in the image source element 110.

Taking FIG. 4 as an example, an image source element 110 shown in FIG. 4 is rectangular, and an edge of the image source element 110 adjacent to a position of a human eye 140 is the left side, and the edge portion at this point can include the portion between this side and the line (thick solid line in FIG. 4) to which P1 belongs.

In an example, an absorbing element can have a polygonal structure, at least one end of the absorbing element is attached to an edge portion of the image source element 110 adjacent to a position of a human eye 140, and other ends do not block imaging light for generating a display image of a scene to be displayed.

In an example, a first absorbing element is attached to a surface of a beam splitting element 120, and a surface attachment area on the beam splitting element 120 does not overlap with the coverage area of imaging light on the beam splitting element 120.

In this example, the coverage area of the imaging light on the beam splitting element 120 is an area where the imaging light is reflected and transmitted, and the imaging light here includes imaging light emitted by an image source element 110 and imaging light of a real scene. Taking FIG. 5 as an example, imaging light emitted by an image source element 110 includes imaging light between imaging light 2001 and imaging light 2002, and imaging light in a real scene includes imaging light between imaging light 5001 and imaging light 5002.

An edge of a coverage area is determined by reflection points and transmission points of edge imaging light emitted by an image source element 110 on a beam splitting element 120 together with transmission points of edge imaging light of the real scene on the beam splitting element 120. In an example, a point closest (most adjacent) to an edge of a beam splitting element 120 is determined from a reflection point and a transmission point of edge imaging light emitted by an image source element 110 on the beam splitting element 120 and a transmission point of edge imaging light of a real scene on the beam splitting element 120, thus it can be determined that the point is one of several points included in the edge of a coverage area.

Taking FIG. 5 as an example, as shown in FIG. 5, a reflection point and a transmission point of the imaging light 2001 emitted by an image source element 110 on a beam splitting element 120 are point B and point D, and the transmission point of imaging light 5001 of a real scene on a beam splitting element 120 is point F. If the point closest (most adjacent) to an edge of the beam splitting element 120 among the three points is point B, it can be determined that point B belongs to points of edge of a coverage area, and point D and point F both belong to points within the coverage area.

Figure 10:
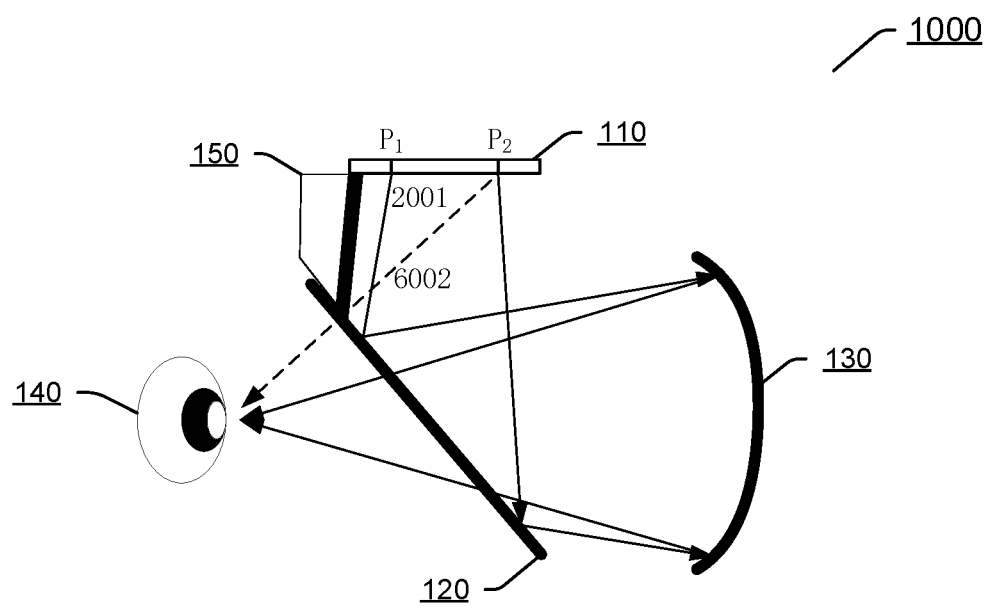
FIG. 10 illustrates a schematic diagram of a first absorbing element in a display device of an example of an embodiment of the present disclosure.

FIG. 10 illustrates a schematic diagram of a first absorbing element in a display device of an example of an embodiment of the present disclosure. As shown in FIG. 10, a first absorbing element 150 is attached to a surface of a beam splitting element 120, and the reflection point of the imaging light 2001 on the beam splitting element 120 belongs to points of imaging light on the edge of a coverage area of the beam splitting element 120. A surface attachment area of the first absorbing element 150 where the first absorbing element is attached to a beam splitting element 120 does not overlap the coverage area of imaging light on the beam splitting element 120, an absorbing layer of the first absorbing element 150 can absorb non-imaging light emitted from an image source element 110. The absorbing layer of the first absorbing element 150 faces toward a reflective element 130. The absorbing layer of the first absorbing element 150 faces toward an imaging light area. A portion of the absorbing layer of the first absorbing element 150 is attached to a surface of the beam splitting element 120.

In an example, in the case that a surface attachment area of a first absorbing element 150 does not overlap with the coverage area of imaging light on a beam splitting element 120, non-imaging light emitted from the position P2 of an image source element 110 and projected to a human eye 140 can be absorbed by the edge portion of the first absorbing element 150. As shown in FIG. 10, the non-imaging light emitted from the position P2 and projected to the human eye 140 is the non-imaging light 6002 (indicated by the dashed line in the figure), and the non-imaging light 6002 is absorbed by the absorbing layer at the lower edge portion of the first absorbing element 150.

In the above example, that the first absorbing element 150 is attached to the surface of the beam splitting element 120 can cause the position of the first absorbing element 150 fixed in a display device.

In an example, an outer edge of a surface attachment area of a first absorbing element 150 on a beam splitting element 120 at least partially overlaps with an outer edge of a coverage area of imaging light on the beam splitting element 120.

Figure 11:
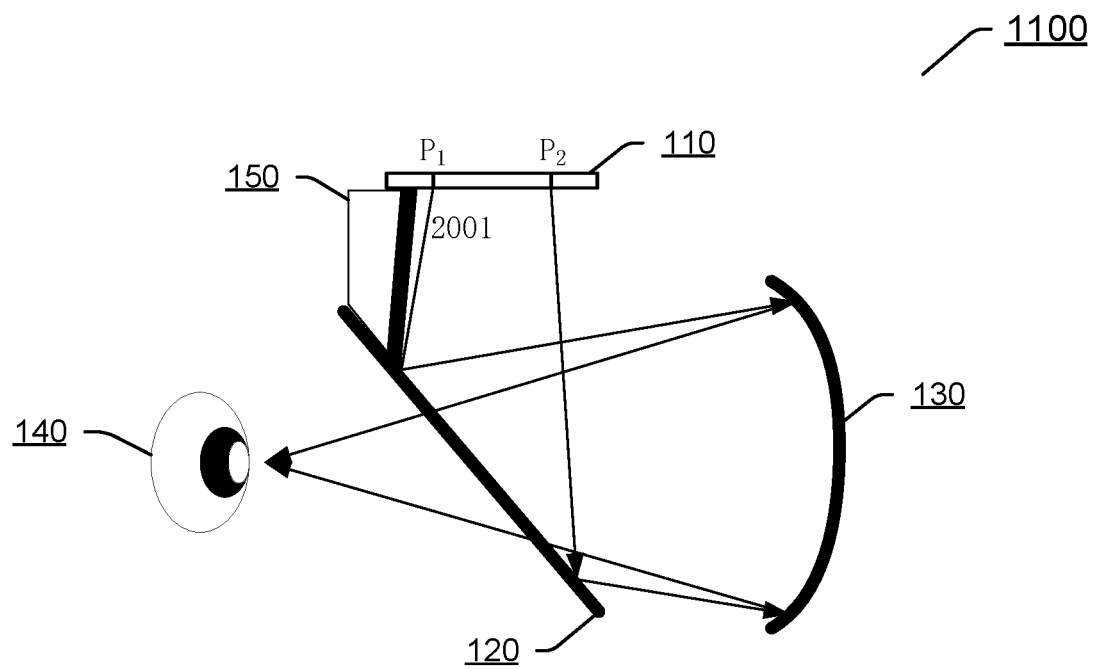
FIG. 11 illustrates a schematic diagram of a first absorbing element in a display device of another example of an embodiment of the present disclosure.

FIG. 11 illustrates a schematic diagram of a first absorbing element 150 in a display device of another example of an embodiment of the present disclosure. As shown in FIG. 11, a reflection point of the imaging light 2001 on a beam splitting element 120 belongs to points of imaging light on an edge of a coverage area of the beam splitting element 120. The outer edge of a surface attachment area of the first absorbing element 150 at least partially overlaps with the outer edge of a coverage area of the imaging light in the beam splitting element 120, wherein the overlapping outer edge portion does not belong to the absorbing layer, and the first absorbing element 150 do not absorb the imaging light 2001. The absorbing layer of the first absorbing element 150 faces toward a reflective element 130. The absorbing layer of the first absorbing element 150 faces toward an imaging light area. The surface attachment area of the absorbing layer of the first absorbing element 150 to which the beam splitting element 120 is attached at least partially overlaps with the outer edge of a coverage area of imaging light on beam splitting element 120, and the overlapping portion is located outside the absorbing layer, and the absorbing layer do not absorb the imaging light 2001.

Figure 12:
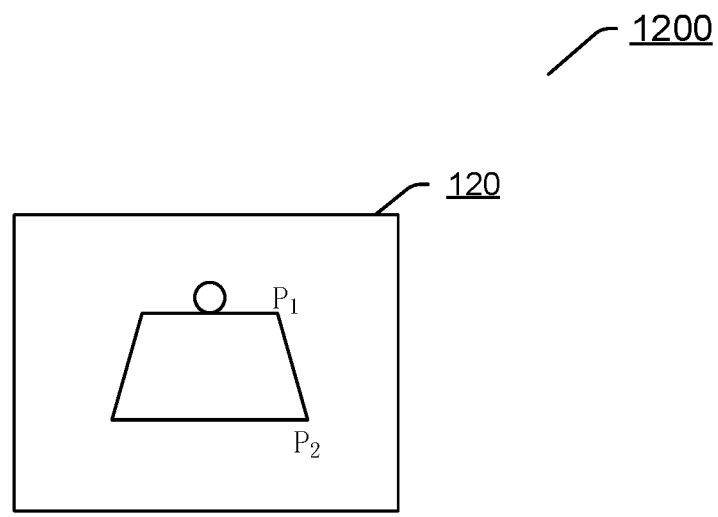
FIG. 12 illustrates a schematic diagram that an outer edge of a surface attachment area of a first absorbing element on a beam splitting element at least partially overlaps with an outer edge of a coverage area of imaging light on the beam splitting element of an example of an embodiment of the present disclosure.

FIG. 12 illustrates a schematic diagram that an outer edge of a surface attachment area of a first absorbing element 150 on a beam splitting element 120 at least partially overlaps with an outer edge of a coverage area of imaging light on the beam splitting element 120 of an example of an embodiment of the present disclosure. The viewing angle of FIG. 12 is a viewing angle perpendicular to the beam splitting element 120.

As shown in FIG. 12, on a surface of the beam splitting element 120, the surface attachment area of the first absorbing element 150 on the beam splitting element 120 is circular. The coverage area of imaging light on the beam splitting element 120 is trapezoid, the upper base of the trapezoid serves as the outer edge of the coverage area and includes the P1 position, and the lower base serves as the outer edge of the coverage area and includes the P2 position. The circular surface attachment area is tangent to the upper base of the trapezoid, namely, they are at least partially overlapped.

In an example, after determining an arrangement position of a first absorbing element 150 in a head-mounted display device, a shape of the first absorbing element 150 can be further determined, so that the first absorbing element 150 does not block the imaging light for producing a display image of a scene to be displayed.

The shape of the first absorbing element 150 can include a shape of a substrate and a shape of an absorbing layer. In an example, when the absorbing layer is thin on the surface of the substrate, the thickness of the absorbing layer can be disregarded, and thus the shape of the absorbing layer can be disregarded.

In an example, a surface of a first absorbing element 150 on the side adjacent to a beam splitting element 120 is parallel to a surface of the beam splitting element 120, and a surface of the first absorbing element 150 on the side adjacent to an image source element 110 is parallel to a surface of the image source element 110.

In another example, when an absorbing layer of a first absorbing element 150 has a planar structure, different angles can be included by the plane of the absorbing layer and the plane of an image source element 110, e.g., a right angle.

In an example, a first absorbing element 150 is not attached to a surface of a beam splitting element 120 such that the first absorbing element 150 can absorb edge non-imaging light. The edge non-imaging light is non-imaging light that is emitted from an image source element 110 and projected to a position of the human eye 140, and edge non-imaging light is from an edge of the image source element 110 generating image away from the position of a human eye 140.

Taking FIG. 10 as an example, an edge of an image source element 110 a generating image away from a position of a human eye 140 includes the position P2, and non-imaging light emitted from the position P2 and projected to the position of the human eye 140 is the non-imaging light 6002 (the light indicated by the dashed line in FIG. 10). In this example, the first absorbing element 150 can absorb the non-imaging light 6002.

Figure 13:
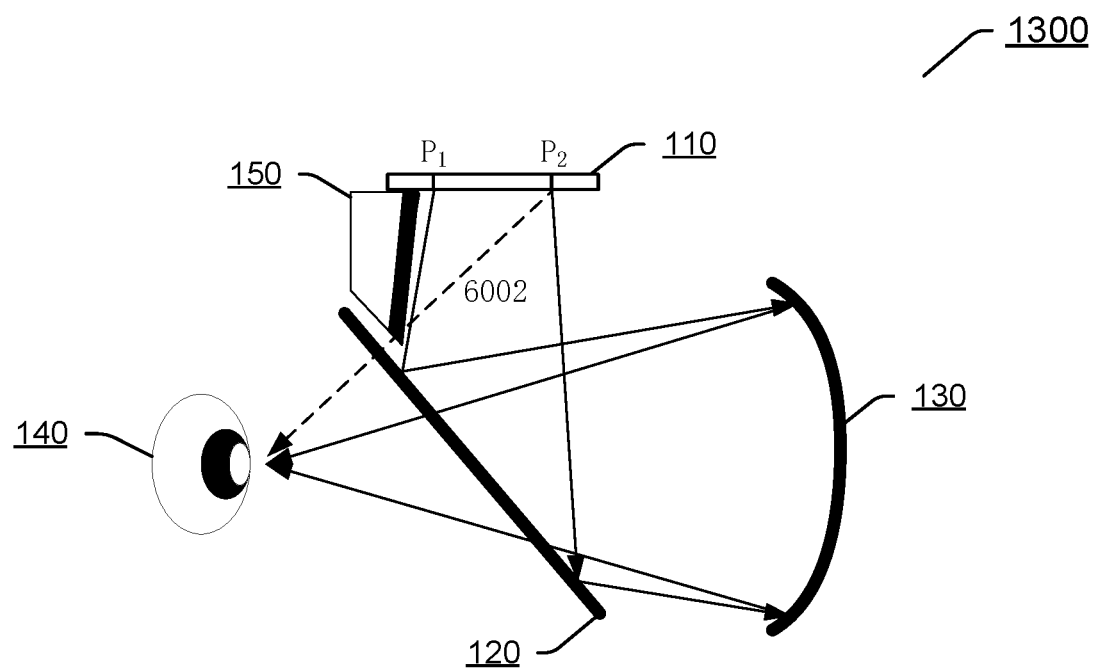
FIG. 13 illustrates a schematic diagram of a first absorbing element in a display device of another example of an embodiment of the present disclosure.

FIG. 13 illustrates a schematic diagram of a first absorbing element 150 in a display device of another example of an embodiment of the present disclosure. As shown in FIG. 13, the first absorbing element 150 is not attached to a surface of a beam splitting element 120, a lower edge portion of the first absorbing element 150 can absorb non-imaging light 6002, and the position on the first absorbing element 150 where the non-imaging light 6002 is absorbed is at a specified distance from the closest edge.

In an example, an edge of an absorbing layer on the side of a first absorbing element 150 adjacent to a beam splitting element 120 overlaps with edge non-imaging light. In this example, the edge of the absorbing layer belongs to the absorbing layer of the first absorbing element 150, which can be configured to absorb non-imaging light.

Figure 14:
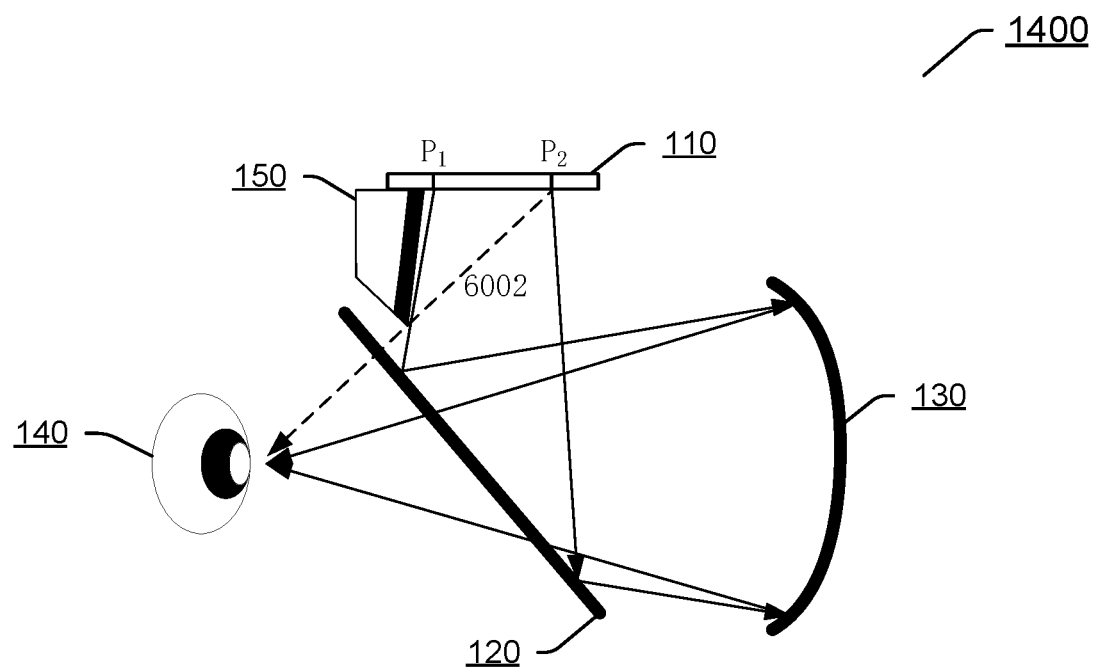
FIG. 14 illustrates a schematic diagram of a first absorbing element in a display device of another example of an embodiment of the present disclosure.

FIG. 14 illustrates a schematic diagram of a first absorbing element 150 in a display device of another example of an embodiment of the present disclosure. As shown in FIG. 14, a side of a first absorbing element 150 adjacent to a beam splitting element 120 is the lower side of the first absorbing element 150, and an edge of an absorbing layer on the lower side overlaps with the non-imaging light 6002, namely, the edge of the absorbing layer can absorb the non-imaging light 6002.

In this example, the surface of the first absorbing element 150 on the side adjacent to the beam splitting element 120 does not block imaging light. Taking FIG. 14 as an example, the surface can be configured to be parallel to a beam splitting element 120 so as not to block imaging light, and the imaging light that is not blocked here includes imaging light emitted by an image source element 110 and light of a real scene.

In an example, a line connecting the two ends of an absorbing layer of a first absorbing element 150 is parallel to imaging light emitted from a position P1. For example, the absorbing layer of the first absorbing element 150 has a planar structure, the absorbing layer of the first absorbing element 150 is parallel to the imaging light emitted from the position P1, and the imaging light emitted from the position P1 is adjacent to the edge of the absorbing layer of the first absorbing element 150, the absorbing layer of the first absorbing element 150 does not absorb the imaging light emitted from the position P1. The position P1 is the most peripheral position where imaging light is emitted by the image source element 110, and the imaging light emitted from the position P1 is the imaging light 2001.

In an example, the distance between an edge of a first absorbing element 150 adjacent to a beam splitting element 120 and an image source element 110 can be configured to range from 1 mm to 90 mm. An included angle between the side of the first absorbing element 150 facing towards the imaging light and the image source element 110 is configured to range from 60° to 130°. An included angle toward imaging light between the first absorbing element 150 and the horizontal plane is configured to range from 50° to 120°.

Figure 15:
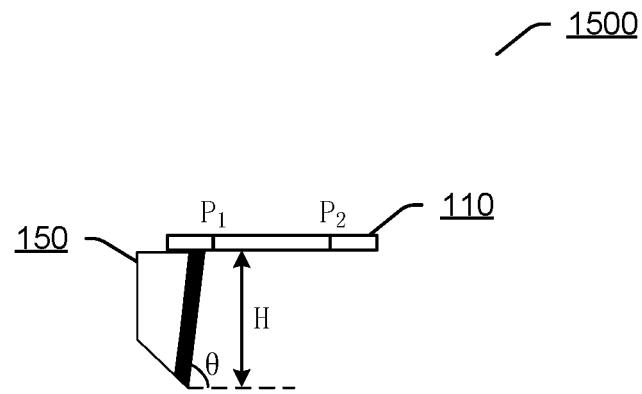
FIG. 15 illustrates a schematic diagram of a height and included angle of a first absorbing element of an example of an embodiment of the present disclosure.

FIG. 15 illustrates a schematic diagram of height and included angle of a first absorbing element 150 of an example of an embodiment of the present disclosure. As shown in FIG. 15, the dashed line is a horizontal plane, and the included angle between the first absorbing element 150 and the horizontal plane is θ, which can be configured to be any angle in a range from 50° to 120°. The distance between the edge of the first absorbing element 150 adjacent to a beam splitting element 120 and an image source element 110 is H, and the H can be configured to be any length in a range from 1 mm to 90 mm. The set θ and H can determine the position of the first absorbing element 150 in a display device.

In an example, an absorbing layer of a first absorbing element 150 is positioned towards the light emitted by an image source element 110 for absorbing non-imaging light emitted by the image source element 110. For example, as shown in FIGS. 10, 11, 13 and 14, an absorbing layer of a first absorbing element 150 faces towards light emitted by an image source element 110, e.g., the non-imaging light 6002. The absorbing layer of the first absorbing element 150 faces towards a reflective element 130.

In an example of the present disclosure, a first absorbing element 150 is not attached to an image source element 110, which can also cause the first absorbing element 150 to absorb non-imaging light in a scene to be displayed, and not block imaging light configured to generate a display image of the scene to be displayed.

In this example, a support point for the first absorbing element 150 in the display device can be a bracket in the display device, and can also be a beam splitting element 120, namely, the first absorbing element 150 is attached to the beam splitting element 120. The support point is configured to fix the arrangement position of the first absorbing element 150 in the display device.

Figure 16:
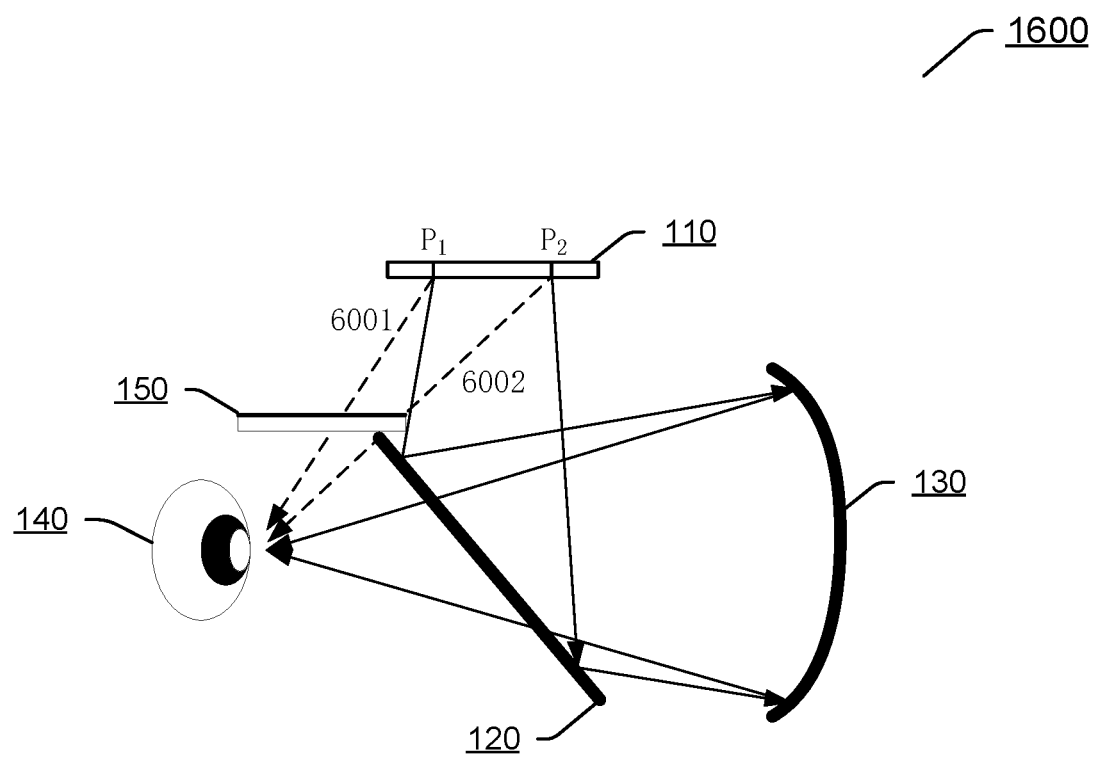
FIG. 16 illustrates a schematic diagram of a first absorbing element in a display device of another example of an embodiment of the present disclosure.

FIG. 16 illustrates a schematic diagram of a first absorbing element 150 in a display device of another example of an embodiment of the present disclosure. As shown in FIG. 16, the first absorbing element 150 is placed horizontally, and an absorbing layer of the first absorbing element 150 faces an image source element 110. The absorbing layer of the first absorbing element 150 faces upwards for absorbing non-imaging light from the image source element 110. An area of the absorbing layer of the first absorbing element 150 should at least cause the first absorbing element 150 to be able to absorb edge non-imaging light 6001 and 6002.

In an example, referring to FIG. 16, the right absorbing layer edge of a first absorbing element 150 can absorb non-imaging light 6002, and the left absorbing layer edge can absorb non-imaging light 6001.

In an example of the present disclosure, an absorbing element can also include a second absorbing element that can be attached to an edge portion of an image source element 110 away from a position of a human eye 140 and extends towards a beam splitting element 120.

In this example, the edge portion away from the position of the human eye 140 includes a portion of the area of the edge in the image source element 110 away from the position of the human eye 140. Taking FIG. 4 as an example, an image source element 110 shown in FIG. 4 is rectangular, and an edge of the image source element 110 away from a position of a human eye 140 is the right side, and the edge part at this point can include the portion between this edge and the edge (thick solid line in FIG. 4) to which P2 belongs.

In this example, the absorbing layer of the second absorbing element is positioned towards the beam splitting element 120. The absorbing layer of the second absorbing element is positioned towards the light emitted by the image source element 110. Non-imaging light that can be absorbed by the second absorbing element includes non-imaging light emitted by the image source element 110 that directly reach a reflective element 130 without being reflected by a beam splitting element 120 and is further reflected to a human eye 140 via the reflective element 130.

Figure 17:
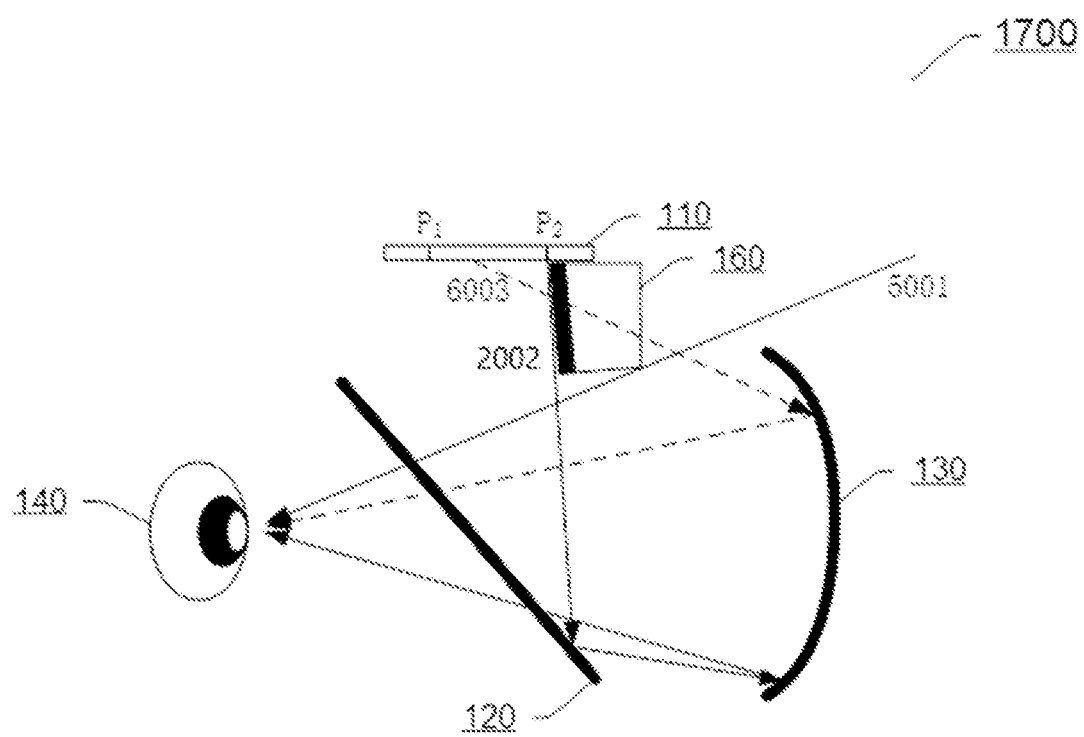
FIG. 17 illustrates a schematic diagram of a second absorbing element in a display device of an example of an embodiment of the present disclosure.

Taking FIG. 17 as an example, FIG. 17 illustrates a schematic diagram of a second absorbing element 160 in a display device of an example of an embodiment of the present disclosure. As shown in FIG. 17, a beam of non-imaging light 6003 emitted by an image source element 110 is not directly incident on a beam splitting element 120, but is directly incident on a reflective element 130, then reflected to the beam splitting element 120 via the reflective element 130, and further transmitted to a human eye 140 through the beam splitting element 120. The non-imaging light 6003 can be absorbed by the second absorbing element 160.

In an example, on the premise that a second absorbing element 160 does not block imaging light of a display image of a scene to be displayed, the shape of the second absorbing element 160 can be specified.

In an example, a line connecting two ends of an absorbing layer of a second absorbing element 160 is parallel to imaging light emitted from a position P2. For example, the absorbing layer of the second absorbing element 160 has a planar structure, the absorbing layer of the second absorbing element 160 is parallel to the imaging light emitted from the position P2, and the imaging light emitted from the position P2 is adjacent to an edge of the absorbing layer of the second absorbing element 160, the absorbing layer of the second absorbing element 160 does not absorb the imaging light emitted from the position P2. The position P2 is the most peripheral position where imaging light is emitted by an image source element 110, and the imaging light emitted from the position P2 is the imaging light 2002.

Figure 18:
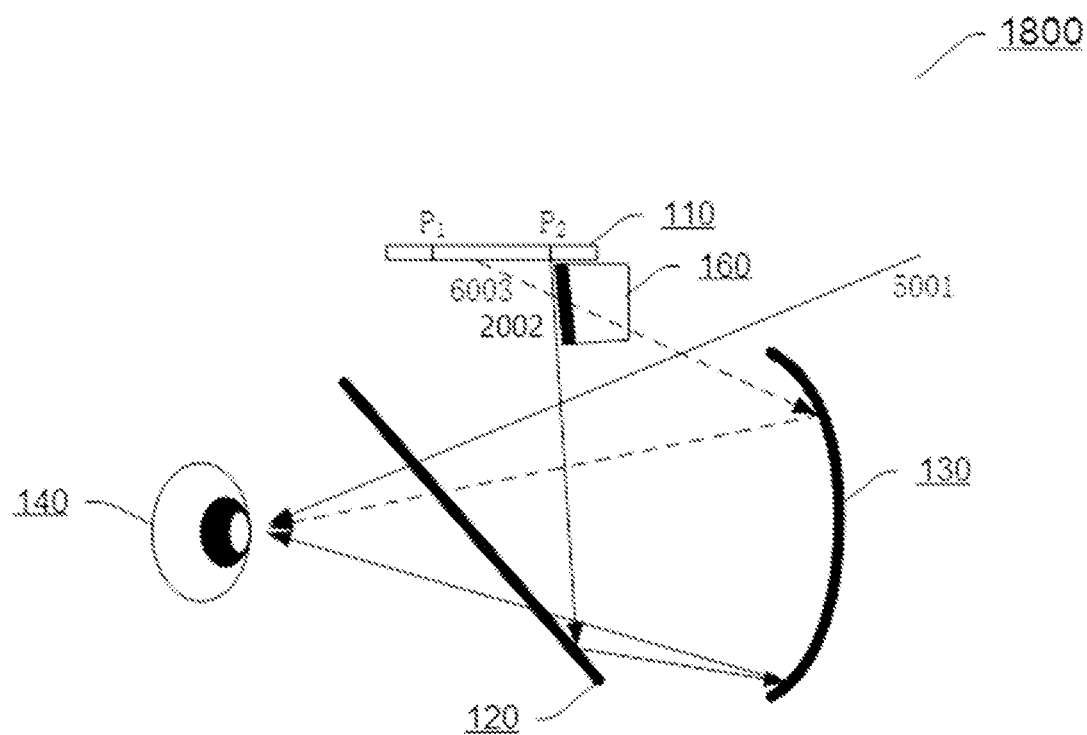
FIG. 18 illustrates a schematic diagram of a second absorbing element in a display device of another example of an embodiment of the present disclosure.

Taking FIG. 17 and FIG. 18 as an example, FIG. 18 illustrates a schematic diagram of a second absorbing element 160 in a display device of another example of an embodiment of the present disclosure. An absorbing layer of the second absorbing element 160 in FIG. 17 and FIG. 18 is configured so that the plane in which the absorbing layer lies is parallel to the edge imaging light 2002, at this point, the area of the absorbing layer can be represented by the distance from the lower end edge of the second absorbing element 160 to an image source element 110. The shape of the second absorbing element 160 in FIG. 17 is different from the shape of the second absorbing element 160 in FIG.

18. The distance representing the second absorbing element 160 in FIG. 17 is h, and the distance representing the second absorbing element 160 in FIG. 18 is h', and h is greater than h', indicating that the area of the second absorbing element 160 in FIG. 17 is larger than that of the second absorbing element 160 in FIG. 18. Both the second absorbing elements 160 in FIG. 17 and FIG. 18 can absorb non-imaging light in a scene to be displayed, and do not block imaging light configured to generate a display image of the scene to be displayed.

In an example, a distance between an edge of a second absorbing element 160 adjacent to a beam splitting element 120 and an image source element 110 is configured to range from 1 mm to 90 mm. An included angle between a side of the second absorbing element 160 facing towards the imaging light and the image source element 110 is configured to range from 60° to 130°. An included angle toward imaging light formed between the second absorbing element 160 and the horizontal plane is configured to be an angle in a range from 50° to 120°.

In an example, an edge of an absorbing layer on the side of a second absorbing element 160 adjacent to a beam splitting element 120 is in contact with but does not overlap with an intersection position, the intersection position is defined by that edge imaging light, away from a human eye position 140, from imaging light emitted by an image source element 110 intersects edge imaging light in a real scene.

Figure 19:
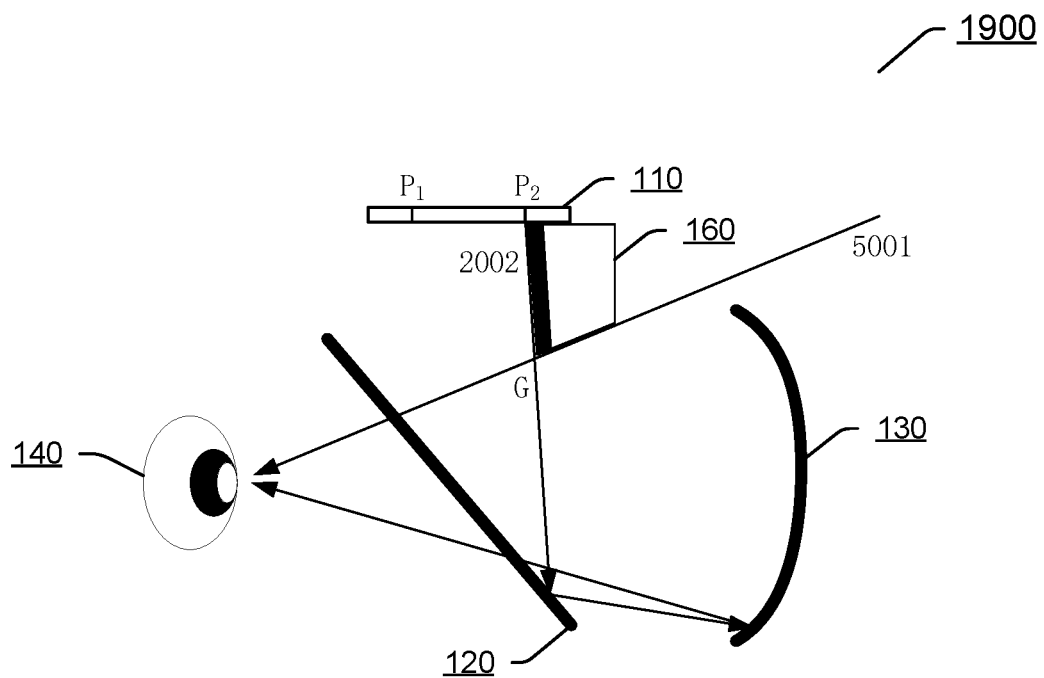
FIG. 19 illustrates a schematic diagram of a second absorbing element in a display device of another example of an embodiment of the present disclosure.

FIG. 19 illustrates a schematic diagram of a second absorbing element 160 in a display device of another example of an embodiment of the present disclosure. As shown in FIG. 19, edge imaging light, from imaging light emitted by an image source element 110, away from a position of a human eye 140 includes imaging light 2002, and edge imaging light of a real scene includes imaging light 5001. An intersection position in this example includes the position G where the imaging light 2002 intersects the imaging light 5001. An edge of an absorbing layer of the second absorbing element 160 on the side adjacent to a beam splitting element 120 is adjacent to and in contact with the intersection position but does not overlap the intersection position, so that the imaging light 2002 and the imaging light 5001 are not blocked or absorbed by the second absorbing element 160 when passing through the intersection position. The surface of the second absorbing element 160 on the side away from the image source element 110 is parallel to edge imaging light of a real scene, e.g., the surface of the second absorbing element 160 on the side far away from the image source element 110 is parallel to the imaging light 5001. The imaging light 5001 is adjacent to the surface of the second absorbing element 160 on the side away from the image source element 110, but is not blocked by the second absorbing element 160.

The arrangement position of the second absorbing element 160 in this example can make the second absorbing element 160 absorb non-imaging light emitted by the image source element 110 and incident on a reflective element 130 to a great extent, thereby reducing the non-imaging light and improving display quality of a display image of a scene to be displayed.

In an example, an absorbing layer of a second absorbing element 160 is positioned towards a beam splitting element 120. A surface of the absorbing layer of the second absorbing element 160 is configured to face towards light emitted by an image source element 110 for absorbing non-imaging light emitted by the image source element 110. For example, as shown in FIGS. 17 and 18, the surface of the absorbing layer of the second absorbing element 160 faces towards light emitted by the image source element 110, e.g., the non-imaging light 6003. In an example, a surface of an absorbing layer of a second absorbing element 160 can be parallel to edge imaging light, emitted by an image source element, closest (most adjacent) to the second absorbing element 160.

A second absorbing element 160 does not block imaging light for a real scene. In an example, a surface of a second absorbing element 160 on the side adjacent to an imaging light area for a real scene can have a designated shape without blocking light of the real scene. For example, as shown in FIG. 17, a surface of a second absorbing element 160 on the side adjacent to an imaging light area for a real scene is parallel to the horizontal plane, and an edge of the second absorbing element 160 is adjacent to, but does not block, the imaging light 5001. As shown in FIG. 18, the surface of a second absorbing element 160 on the side adjacent to an imaging light area is parallel to the horizontal plane and spaced by a distance from the 5001 imaging light. As shown in FIG. 19, the surface of a second absorbing element 160 on the side adjacent to an imaging light area is parallel to edge imaging light of a real scene (namely, 5001 imaging light).

In another example of the present disclosure, a second absorbing element 160 is not attached to an image source element 110, which can also cause the second absorbing element 160 to absorb non-imaging light in a scene to be displayed, and not block imaging light configured to generate a display image of the scene to be displayed.

In this example, a support point for the second absorbing element 160 in a display device can be a bracket in the display device, and the support point on the bracket is configured to fix the position of the second absorbing element 160 in the display device.

Figure 20:
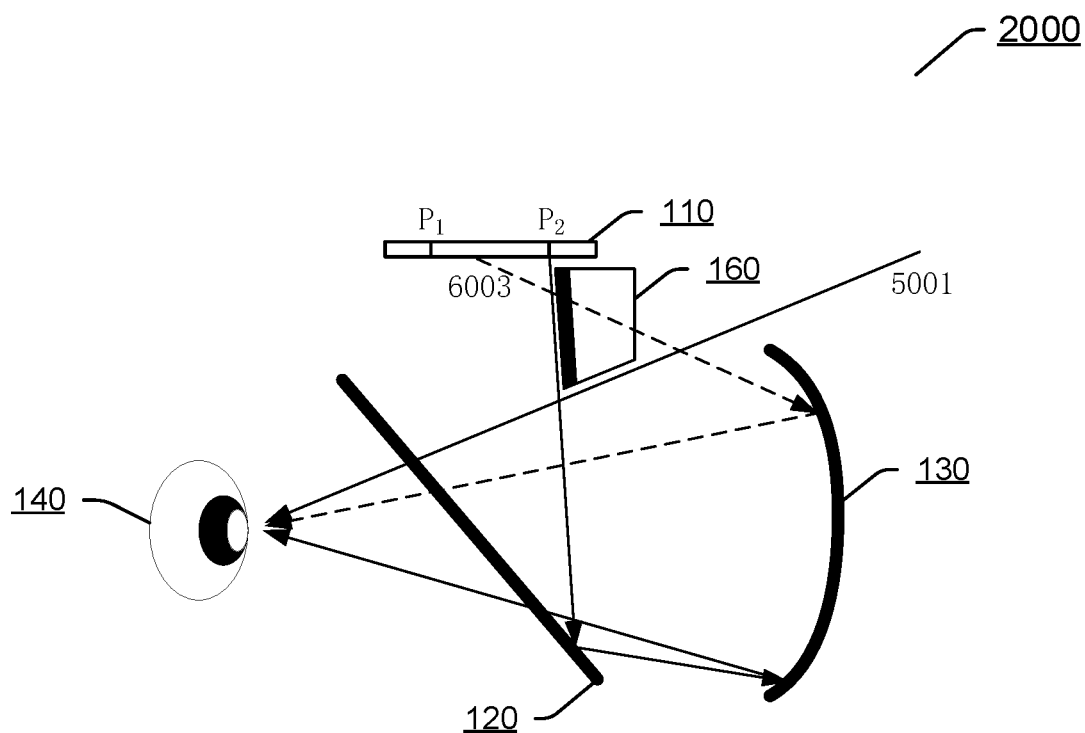
FIG. 20 illustrates a schematic diagram of a second absorbing element in a display device of another example of an embodiment of the present disclosure.

FIG. 20 illustrates a schematic diagram of a second absorbing element 160 in a display device of another example of an embodiment of the present disclosure. As shown in FIG. 20, a second absorbing element 160 is not attached to an image source element 110, and an absorbing layer of the second absorbing element 160 faces towards light emitted by the image source element 110. The second absorbing element 160 is connected to a bracket (not shown in the drawings) to be fixed at a position.

Figure 21:
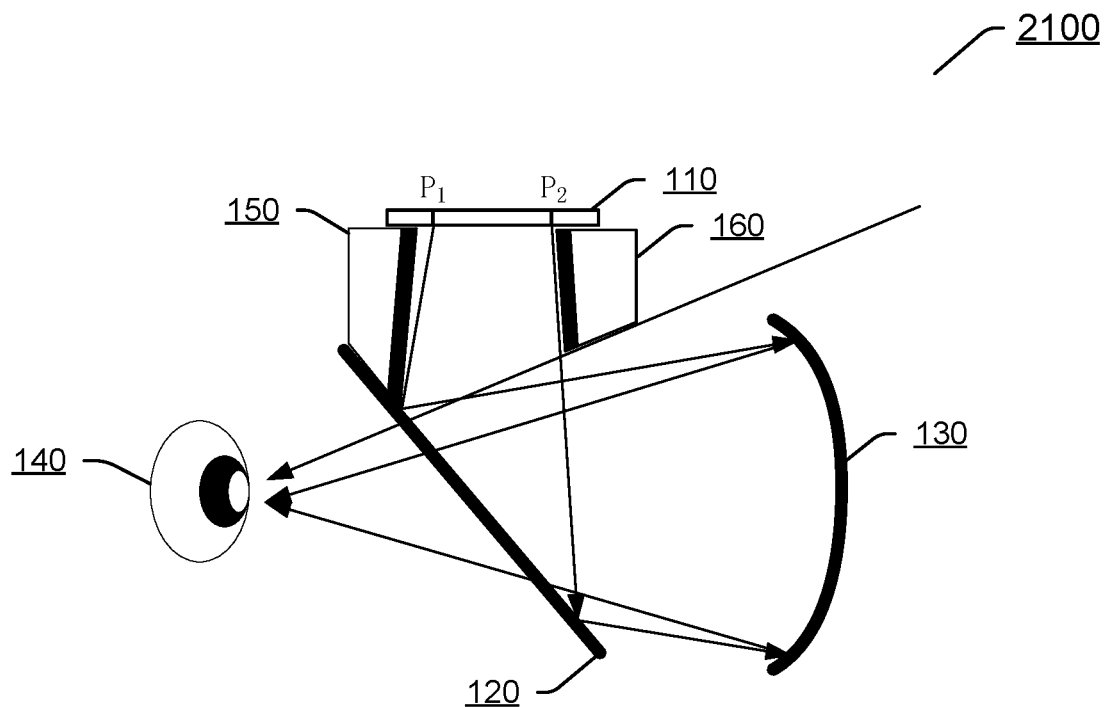
FIG. 21 illustrates a schematic diagram that a display device includes a first absorbing element and a second absorbing element of an example of an embodiment of the present disclosure.

In an example of the present disclosure, an absorbing element includes a first absorbing element 150 and a second absorbing element 160. FIG. 21 illustrates a schematic diagram that a display device includes a first absorbing element 150 and a second absorbing element 160 of an example of an embodiment of the present disclosure. As shown in FIG. 21, a first absorbing element 150 is located on the left and a second absorbing element 160 is located on the right. Both the first absorbing element 150 and the second absorbing element 160 can absorb non-imaging light in a scene to be displayed.

In an example of the present disclosure, an image source element 110 can include an aberration corrector, the aberration corrector is configured to correct aberration of imaging light emitted by the image source element 110 and emit the corrected imaging light to a beam splitting element 120.

Figure 22:
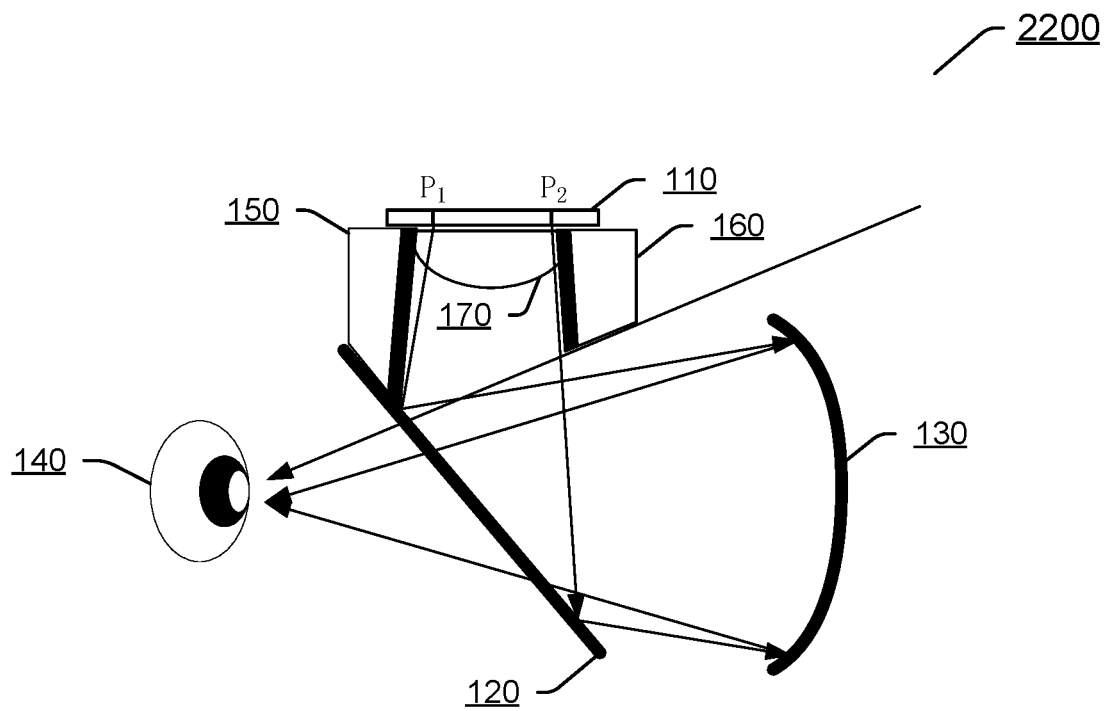
FIG. 22 illustrates a schematic diagram of a display device including a phase difference corrector of an embodiment of an example of the present disclosure.

FIG. 22 illustrates a schematic diagram of a display device including a phase difference corrector of an example of an embodiment of the present disclosure. As shown in FIG. 22, an aberration corrector 170 is located on the side where an image source element 110 emits imaging light, so that the imaging light emitted by the image source element 110 is corrected by the aberration corrector 170.

In an example, a display device includes an optical imaging apparatus including an image source element, a beam splitting element, and a reflective element configured to be aligned on a light path; light emitted by the image source element is reflected to the reflective element through the beam splitting element, the reflective element reflects light to the beam splitting element, and the beam splitting element transmits light; and an absorbing element including a first absorbing element, the surface of the first absorbing element on the side facing towards the reflective element is parallel to the imaging light emitted from the most peripheral position where the image source element emits imaging light.

In an example, a surface of a first absorbing element on the side adjacent to a beam splitting element is parallel to a surface of the beam splitting element, and a surface of the first absorbing element on the side adjacent to an image source element is parallel to a surface of the image source element.

In an example, an absorbing element further includes a second absorbing element, and a surface of the second absorbing element on the side adjacent to an imaging light area for a real scene is parallel to edge imaging light in the real scene.

In an example, a surface of a second absorbing element on the side facing towards a beam splitting element is parallel to imaging light emitted from the most peripheral position where an image source element emits imaging light.

In an example, a display device includes an optical imaging apparatus including an image source element, a beam splitting element, and a reflective element configured to be aligned on a light path; light emitted by the image source element is reflected to the reflective element through the beam splitting element, the reflective element reflects light to the beam splitting element, and the beam splitting element transmits light; and an absorbing element including a first absorbing element and a second absorbing element, a surface of the first absorbing element on a side facing towards the reflective element is parallel to imaging light emitted from the most peripheral position where the image source element emits imaging light, a surface of a second absorbing element on a side facing towards a beam splitting element is parallel to imaging light emitted from the most peripheral position where an image source element emits imaging light, the surface of the first absorbing element on the side facing towards the reflective element and the surface of the second absorbing element on the side facing towards the beam splitting element are both provided with an absorbing coating.

The term "exemplary" used throughout the description means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The optional implementations of the embodiments of the present disclosure are described above in detail in conjunction with the appended drawings, however, the embodiments of the present disclosure are not limited to the specific details in the foregoing embodiments, within the scope of the technical concept of the embodiments of the present disclosure, a variety of simple variations may be made to the technical solutions of the embodiments of the present disclosure, which all fall into the scope of the embodiments of the present disclosure.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. A display device, comprising:
   an optical imaging apparatus comprising an image source element, a beam splitting element and a reflective element configured to be aligned on a light path, light emitted by the image source element being reflected by the beam splitting element to the reflective element, the light being reflected by the reflective element to the beam splitting element, and the light being transmitted by the beam splitting element, wherein the image source element comprises an image projection area configured to generate and project imaging light for generating a display image in a scene to be displayed and non-imaging light in the scene to be displayed; and
   an absorbing element having a shape and an arrangement position in the display device to enable the absorbing element to absorb the non-imaging light, and not block the imaging light,
   wherein the absorbing element comprises a first absorbing element attached to an edge portion of the image source element adjacent to a human eye position and extending toward the beam splitting element.

2. The display device of claim 1,
   wherein the human eye position and the reflective element are respectively located on both sides of the beam splitting element, and the reflective element reflects the imaging light to the human eye position.

3. The display device of claim 2, wherein the first absorbing element is attached to a surface of the beam splitting element, and a surface attachment area on the beam splitting element does not overlap with a coverage area of the imaging light on the beam splitting element.

4. The display device of claim 3, wherein an outer edge of the surface attachment area at least partially overlaps with an outer edge of the coverage area, wherein the surface attachment area is an area where the first absorbing element is attached to the surface of the beam splitting element, and the coverage area is an area where the imaging light covers the surface of the beam splitting element.

5. The display device of claim 2, wherein a surface of the first absorbing element on a side adjacent to the beam splitting element is parallel to the surface of the beam splitting element, and a surface of the first absorbing element on a side adjacent to the image source element is parallel to a surface of the image source element.

6. The display device of claim 1, wherein the absorbing element further comprises a second absorbing element attached to an edge portion of the image source element away from a human eye position and extending toward the beam splitting element,
   wherein the human eye position and the reflective element are respectively located on both sides of the beam splitting element, and the reflective element reflects imaging light to the human eye position.

7. The display device of claim 6, wherein an edge of an absorbing layer on a side of the second absorbing element adjacent to the beam splitting element is in contact with but does not overlap with an intersection position, the intersection position is defined by that edge imaging light, away from the human eye position, from the imaging light emitted by the image source element intersects edge imaging light in a real scene, the second absorbing element is configured not to block imaging light for the real scene.

8. The display device of claim 7, wherein a surface on a side of the second absorbing element adjacent to an imaging light area for the real scene is parallel to the edge imaging light emitted by the most peripheral position of the image source element in the real scene.

9. The display device of claim 8, wherein a surface of the absorbing layer of the second absorbing element is parallel to the edge imaging light, emitted by the most peripheral position of the image source element, most adjacent to the second absorbing element.

10. The display device of claim 1, wherein the absorbing element comprises a substrate and an absorbing layer, a surface of the absorbing layer is positioned towards light emitted by the image source element.

11. The display device of claim 10, wherein the absorbing layer has a planar structure or a concave structure.

12. The display device of claim 10, wherein the absorbing layer has an array formed by microstructures, and recesses are formed between two adjacent microstructures in the array, the microstructures have at least one of a triangular structure, parallelogram structure, trapezoidal structure, and rectangular structure.

13. The display device of claim 11, wherein a surface of a planar structure or a concave structure of the absorbing layer has an absorbing coating, and an absorbing wavelength band of the absorbing coating includes at least one of an emission wavelength band of the image source element and an entire visible light wavelength band.

14. The display device of claim 1, wherein a distance between an edge of respective absorbing elements adjacent to the beam splitting element and the image source element is configured to range from 1 mm to 90 mm, an included angle, formed by respective absorbing elements and a horizontal plane, facing towards the imaging light is configured to range from 50° to 120°.

15. The display device of claim 1, wherein the image source element comprises an aberration corrector configured to correct aberration of imaging light emitted by the image source element and transmit the corrected imaging light to the beam splitting element;

the image source element, the beam splitting element, and the reflective element form one of a composite air-conducting structure and a free-form curved prism system;

the display device is an augmented reality display device, and a display image of the scene to be displayed comprises a virtual scene image and a real scene image.

16. A display device, comprising:
an optical imaging apparatus comprising:
an image source element configured to emit image light,
a beam splitting element configured to reflect the image light from the image source, and
a reflective element configured to reflect the image light from the beam splitting element back to the beam splitting element and transmit light from the real world to the beam splitting element, the beam splitting element further configured to receive the image light and the light from the real word and transmit the image light and the light from the real word to a human eye position, wherein the image source element comprises an image projection area configured to generate and project imaging light for generating a display image in a scene to be displayed and non-imaging light in the scene to be displayed; and an absorbing element arranged at an edge portion of the image source element and having a first surface attached to the image source element and a second surface parallel to the beam splitting element, wherein the absorbing element is configured to absorb the non-imaging light, and not block the imaging light, wherein the absorbing element comprises a first absorbing element attached to the edge portion of the image source element adjacent to a human eye position and extending toward the beam splitting element.

17. The display device of claim 16, wherein the absorbing element comprises a substrate and an absorbing layer arranged on a third surface of the absorbing layer, and the absorbing layer is positioned towards the reflective element.

18. The display device of claim 17, wherein the display device further comprises another absorbing element arranged at another edge portion of the image source element away from the absorbing element.

19. The display device of claim 18, wherein the another absorbing element has a first surface attached to the image source element and a second surface parallel to an edge imaging light emitted by the most peripheral position of the image source element in the real scene.

20. A display device, comprising:
an optical imaging apparatus comprising:
an image source element configured to emit image light,
a beam splitting element configured to reflect the image light from the image source, and
a reflective element configured to reflect the image light from the beam splitting element back to the beam splitting element and transmit light from the real world to the beam splitting element, the beam splitting element further configured to receive the image light and the light from the real world and transmit the image light and the light from the real world to a human eye position, wherein the image source element comprises an image projection area configured to generate and project imaging light for generating a display image in a scene to be displayed and non-imaging light in the scene to be displayed; and an absorbing element arranged at an edge portion of the image source element and having a first surface attached to the image source element and a second surface parallel to an edge imaging light emitted by the most peripheral position of the image source element in the real scene, wherein the absorbing element is configured to absorb the non-imaging light, and not block the imaging light, wherein the absorbing element comprises a first absorbing element attached to the edge portion of the image source element adjacent to a human eye position and extending toward the beam splitting element.

* * * * *